United States Patent [19]
Ettischer et al.

[11] 3,854,810
[45] Dec. 17, 1974

[54] SYNCHRONIZING MECHANISM FOR FLASH AND SHUTTER ACTUATION

[75] Inventors: Helmut Ettischer, Ruit; Peter Huschle, Boblingen, both of Germany

[73] Assignee: Eastman Kodak Company, Rochester, N.Y.

[22] Filed: June 4, 1973

[21] Appl. No.: 366,399

[30] Foreign Application Priority Data
July 24, 1972 Germany.......................... 2236183

[52] U.S. Cl. ............................................. 354/142
[51] Int. Cl. .......................................... G03b 15/04
[58] Field of Search ........ 95/11 L, 11.5 R; 354/142

[56] References Cited
UNITED STATES PATENTS

| | | | |
|---|---|---|---|
| 3,584,551 | 6/1971 | Dierks et al. | 95/11.5 R |
| 3,640,196 | 2/1972 | Brooks | 95/11.5 R |
| 3,687,033 | 8/1972 | Beach | 95/11.5 R |
| 3,747,491 | 7/1973 | Becker et al. | 95/11.5 R |

*Primary Examiner*—John M. Horan
*Assistant Examiner*—Kenneth C. Hutchison
*Attorney, Agent, or Firm*—R. F. Brothers

[57] ABSTRACT

Photographic apparatus includes a synchronizing mechanism for actuating the camera shutter mechanism in a timed relationship with flash actuation. The shutter mechanism is operatively coupled to a synchronizing lever which is movable to engage a pre-energized striker within a received flash unit. The synchronizing lever causes actuation of the shutter mechanism in response to release of the pre-energized striker and its subsequent movement to a flash actuating position. In each embodiment, a mechanism is provided for actuating the shutter mechanism in the absence of a received flash unit.

6 Claims, 4 Drawing Figures

SYNCHRONIZING MECHANISM FOR FLASH AND SHUTTER ACTUATION

BACKGROUND OF THE INVENTION

1. Field of the Invention

The present invention relates generally to photographic apparatus and in particular to a synchronizing mechanism for insuring proper operation of a shutter and flash in a timed relationship.

2. Description of the Prior Art

The use of percussion ignitable flash units is now well known in the photographic arts. Many mechanisms have been developed for insuring synchronization of shutter actuation and percussion ignition of a flash unit. In most of the known mechanisms, the entire synchronizing structure is located within the camera. One such structure is disclosed in U.S. Pat. No. 3,640,196, in which a high energy member is first energized, for example in response to film winding, and then is released by operator control to effect the operation of both the shutter mechanism and the flash device. Another mechanism is disclosed in U.S. Pat. No. 3,544,250, in which the body release is itself used as a synchronizing member with separately energized members being used to cause actuation of the shutter and flash firing after movement of the body release a predetermined distance. A third structure is disclosed in copending application Ser. No. 299,972; SYNCHRONIZING MECHANISM FOR FLASH FIRING AND SHUTTER ACTUATION; filed in the name of William H. Horton on Oct. 24, 1972, now U.S. Pat. No. 3,800,308. In this structure, synchronization is achieved by actuating the shutter only after release of a pre-energized striker wire within the flash unit. A sensing and actuating arm is moved upwardly to release the pre-energized striker, which frees the arm for further movement in an upward direction to cause actuation of the shutter mechanism. Each of these known mechanisms relies upon movement of a member within the camera for synchronization and will actuate the shutter even if the pre-energized striker fails to move to ignite its associated flashlamp when released.

SUMMARY OF THE INVENTION

Accordingly, it is an object of the present invention to provide an improved mechanism for synchronizing firing of a flash device and actuation of a shutter mechanism.

Another object of the present invention is to provide such an improved mechanism which synchronizes flash and shutter operation by means of a pre-energized striker in the flash device.

Still another object of the present invention is to provide such an improved mechanism which synchronized flash and shutter operation by causing shutter actuation in response to movement of a pre-energized striker to a flash actuating position.

These and other objects are accomplished according to the present invention by a synchronizing mechanism which comprises a synchronizing member movable to actuate the flash device under urging of the body release. Initial movement of the synchronizing member brings it into a shutter actuating position and into contact with a pre-energized striker of a received flash device. Subsequent movement causes release of the pre-energized striker which, in turn, causes movement of the synchronizing member to actuate the shutter mechanism. Thus, synchronous actuation of the shutter mechanism and firing of the flash device is achieved in response to movement of the pre-energized striker toward its flash actuating position. In each embodiment, a mechanism is provided for actuating the shutter mechanism in the absence of a received flash device.

BRIEF DESCRIPTION OF THE DRAWINGS

In the description of the preferred embodiments of the invention, reference is made to the accompanying drawings in which.

DESCRIPTION OF THE PREFERRED EMBODIMENTS

Because photographic apparatus is well known, the present description will be directed in particular to elements forming part of, or cooperating more directly with, the present invention. Camera elements not specifically shown or described herein are understood to be selectable from those known in the art.

Figure 1:
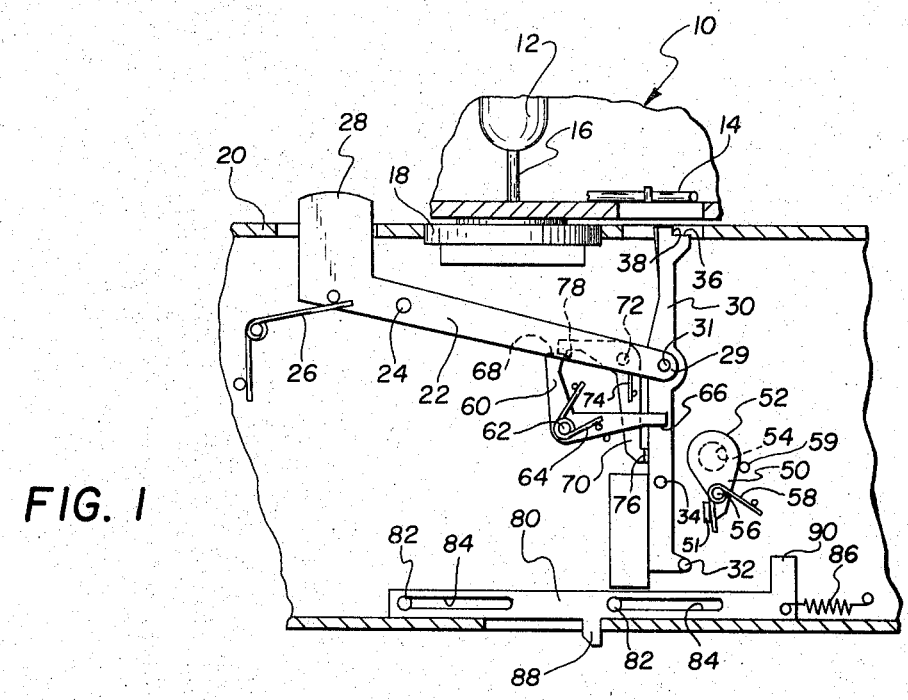
FIG. 1 is a front view of photographic apparatus incorporating the synchronizing mechanism of the present invention, prior to actuation of the photographic apparatus.

In FIG. 1, photographic apparatus according to this invention is illustrated which is adapted for use with a multilamp flash device, shown generally as 10, which is of the type known in the art. Flash device 10 consists of a plurality of individual flashlamps 12, each of which has associated with it a pre-energized striker 14 which is assembled in a cocked position as illustrated in FIG. 1 and which is releasable for movement to strike against a primer 16 associated with flashlamp 12. Striking of the primer 16 by a pre-energized striker 14 results in ignition of flashlamp 12 and the generation of artificial light. Flash device 10 is releasably mounted on a flash socket 18 in the camera.

The photographic camera comprises a camera body 20 in which are mounted the various mechanisms which are to be described in detail below, including: a body release lever 22, a synchronizing member 30, a shutter 50, a release lever 60, an actuating lever 70, and a film advance slide 80. Body release lever 22 is pivotally mounted on a pin 24, fixed within the camera, and is biased in a clockwise direction by a spring 26. Body release lever 22 terminates at opposite ends in a button 28 and an actuating end 29. Body release lever 22 is biased by spring 26 so that button 28 extends externally of camera body 20, to be readily accessible by a camera operator.

Synchronizing lever 30 is generally elongated in form and is movably mounted on actuating end 29 of body release lever 22 by means of a pin 31. Lever 30 further includes a shutter actuating lug 32, fixed pin 34, a flash actuating surface 36 and a shutter actuating surface 38.

Shutter 50 is of a form well known in the art which includes an actuating lug 51 and an aperture covering portion 52 which extends over and covers an aperture 54 in the camera, shown in phantom in FIG. 1. Shutter 50 is biased in a clockwise direction about a pin 56, fixed within the camera, by a spring 58 to a rest position in which aperture 54 is covered by portion 52 and shutter 50 abuts a stop 59.

Release lever 60 is pivotally mounted on a pin 62, fixed within the camera, and is biased in a clockwise direction by spring 64. Release lever 60 includes an engaging surface 66 and a latching surface 68.

Actuating lever 70 is pivotally mounted on a pin 72, fixed within the camera, and is biased in a counterclockwise direction by a spring 74. Lever 70 includes a shutter actuating surface 76 and a latching surface 78.

Film advance slide 80 is slidably mounted within the camera by means of pins 82 which extend through slots 84 in film advance slide 80. Film advance slide 80 is biased to a rest position illustrated in FIG. 1 by a spring 86. Film advance slide 80 further includes a slide button 88, which is externally accessible, and a cocking lug 90.

Figure 2:
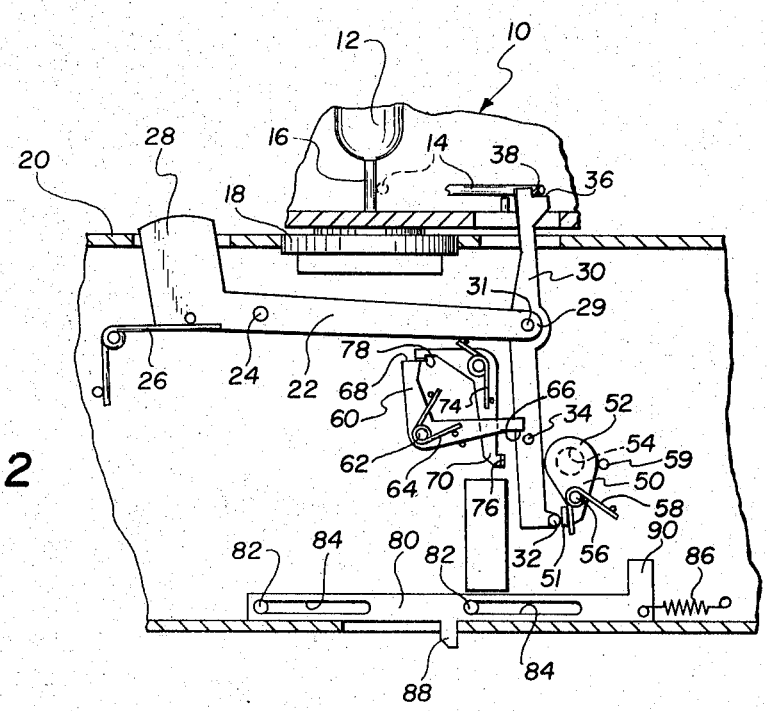
FIG. 2 is a front view of the photographic apparatus of FIG. 1 with the body release partially depressed just prior to flash actuation.

Operation of the mechanism of the present invention with a flash device 10 in position on the camera will now be described. Body release lever 22 pivots about pin 24 as the operator depresses button 28, resulting in upward movement of actuating end 29 which is transmitted by means of pin 31 to synchronizing lever 30. As synchronizing lever 30 moves upwardly, flash actuating surface 36 comes into engagement with a pre-energized striker 14 and shutter actuating lug 32 comes into alignment with actuating lug 51, as is illustrated in FIG. 2. After movement of lever 30 a predetermined distance, pre-energized striker 14 is released from its energized position for movement toward primer 16 to effect actuation of flashlamp 12. Such movement results in engagement of pre-energized striker 14 with shutter actuating surface 38 on synchronizing lever 30. Continued movement of pre-energized striker 14 results in pivoting of synchronizing lever 30 about pin 31, with shutter actuating lug 32 coming into contact with actuating lug 51 on shutter 50 and thereby driving shutter 50 to its exposure aperture opening position. As synchronizing lever 30 is pivoted, pre-energized striker 14 will disengage from shutter actuating surface 38 and will continue to move to strike primer 16. Thus, synchronization of flash actuation and shutter operation is insured, since shutter actuation will not occur until pre-energized striker 14 is released and begins its movement toward primer 16. In the absence of a pre-energized striker, the shutter must be actuated by another means.

Release lever 60 and actuating lever 70 cause shutter actuation when no flash unit 10 is coupled to the camera. Body release lever 22 is rotated in a counterclockwise direction by the operator. As synchronizing lever 30 moves upwardly, pin 34 engages surface 66 causing release lever 60 to rotate in a counterclockwise direction about pin 62. Latching surface 68 is thus disengaged from latching surface 78, permitting counterclockwise rotation of actuating lever 70 under the bias of spring 74. Shutter actuating surface 76 is in engagement with synchronizing lever 30 and causes synchronizing lever 30 to rotate in a counterclockwise direction about pin 31. Rotation of synchronizing lever 30 causes shutter actuation by engagement of shutter actuating lug 32 with actuating lug 51 on shutter 50. The positioning of fixed pin 34 is such that engagement of fixed pin 34 by engaging surface 66 will not take place when a pre-energized striker 14 is present in a flashlamp and thus operation of the camera mechanisms with a flash device is achieved by pre-energized striker 14, whereas operation of the camera mechanism without a flash device is achieved by engagement of fixed pin 34 and engaging surface 66.

In either flash or daylight operation, operator release of button 28 permits body release lever 22 to return to its rest position under the bias of spring 26. Synchronizing lever 30 is moved downward out of flashlamp 12 to permit indexing of flash device 10 and preparation of the camera for a subsequent exposure. Cocking of the camera mechanism is achieved by film advance slide 80, which is operatively coupled with a film advance mechanism of a type known in the art. As the operator presses on slide button 88 and causes film advance slide 80 to move from its rest position as illustrated in FIG. 1, cocking lug 90 comes into engagement with shutter actuating lug 32 causing clockwise rotation of synchronizing lever 30 about pin 31, until it is returned to the position illustrated in FIG. 1. Lever 30 will remain in this position until subsequent actuation of body release lever 22 by the camera operator. As synchronizing lever 30 moves, it engages shutter actuating surface 76 of actuating lever 70 in the daylight mode of operation, and returns actuating lever 70 to its cocked position, with latching surfaces 68 and 78 engaged.

Figure 3:
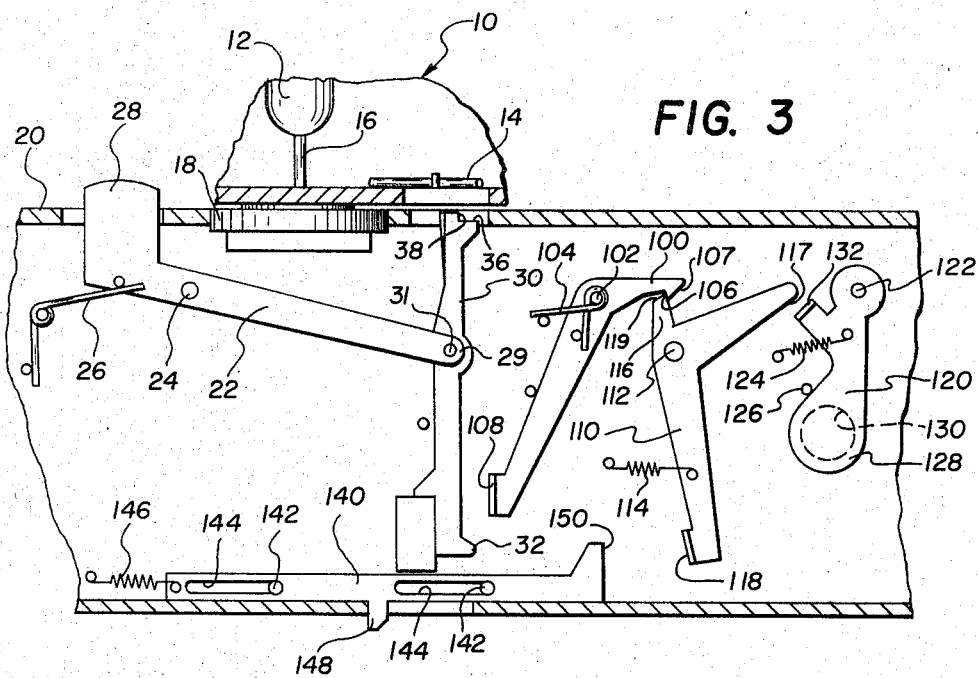
FIG. 3. is a front view of a second embodiment of photographic apparatus incorporating the present invention.

In the embodiment illustrated in FIG. 3, rotation of synchronizing lever 30 is operative to release a shutter driver for operation of the shutter, rather than for driving the shutter directly as in the embodiment illustrated in FIG. 1. Operation without a flash unit may be achieved by inclusion of a release lever 60 and an actuating lever 70 which, for ease of viewing, have been omitted from the embodiment illustrated in FIG. 3. The camera illustrated in FIG. 3 comprises a body release lever 22 which is identical to that illustrated in FIG. 1, along with a synchronizing lever 30 which is also essentially the same as that illustrated in FIG. 1. The camera further comprises a shutter latch 100, a high energy lever 110, a shutter 120 and a film advance slide 140. Shutter latch 100 is pivotally mounted on a pin 102, fixed within the camera and is biased in a clockwise direction by a spring 104. Latch 100 comprises a latching end 106, a cam surface 107 and an actuating surface 108.

High energy lever 110 is pivotally mounted on a pin 112, fixed within the camera and is biased in a clockwise direction by a spring 114. Lever 110 includes a latch end 116, a shutter actuating end 117, a cocking surface 118 and a cam surface 119.

Shutter 120 is of conventional design and is mounted on a pin 122, fixed within the camera, and is biased in a clockwise direction by spring 124 to a rest position abutting pin 126, fixed within the camera. Shutter 120 includes an aperture covering portion 128 which is aligned with an aperture 130, shown in phantom in FIG. 3, when shutter 120 is in its rest position abutting pin 126. Shutter 120 further includes an actuating lug 132.

Film advance slide 140 is slidably mounted within the camera by means of pins 142 extending through slots 144. Film advance slide 140 is biased to a rest position, illustrated in FIG. 3, by a spring 146. Film advance slide 140 further includes a slide button 148, which is externally accessible and a cocking surface 150.

For flash operation, the operator depresses button 28 causing counterclockwise rotation of body release lever 22 and subsequent movement of synchronizing lever 30 in an upward direction. Such movement of lever 30 continues until flash actuating surface 36 engages pre-energized striker 14 and shutter actuating lug 32 is aligned with actuating surface 108. Continued movement effects release of pre-energized striker 14, which begins to move to contact primer 16. Such movement causes rotation of synchronizing lever 30 by engagement of pre-energized striker 14 with shutter actuating surface 38. Actuating lug 32 engages actuating surface 108 on shutter latch 100, causing rotation of shutter latch 100 in a counterclockwise direction and subsequent unlatching of latch end 106 from latch end 116. High energy lever 110 is thereby freed for shutter actuation in which shutter actuating end 117 engages actuating lug 132 and drives shutter 120 in a counterclockwise direction against the bias of spring 124 to an aperture uncovering position. Shutter actuating end 117 then disengages actuating lug 132 and shutter 120 is returned to its rest position by spring 124.

Upon release of button 28 by the operator, spring 26 returns button 28 to its externally accessible position and further causes downward movement of synchronizing lever 30. Spring 104 returns shutter latch 100 to its rest position, while spring 114 maintains lever 110 in an uncocked position. The operator may now cock the camera mechanisms for future operation by actuating of film advance slide 140, by means of slide button 148. As film advance slide 140 moves to the right, cocking surface 150 engages cocking surface 118 and rotates high energy lever 110 in a counterclockwise direction against the bias of spring 114, with cam surface 119 engaging cam surface 107 until high energy lever 110 is latched in its cocked position by engagement of latching ends 106 and 116. The mechanisms will now have been returned to the positions illustrated in FIG. 3 and will be ready for subsequent exposure operation of the camera.

Figure 4:
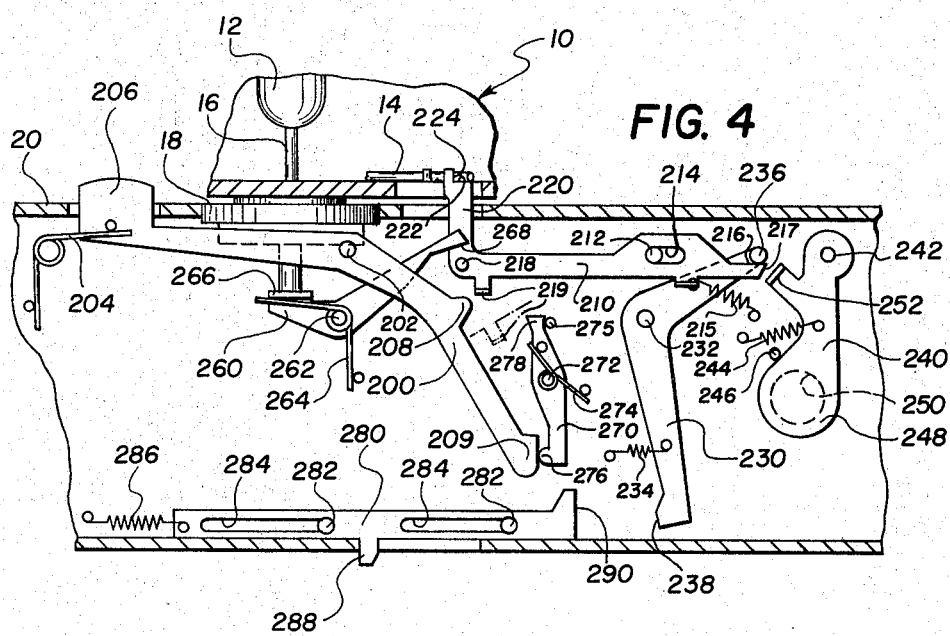
FIG. 4 is a front view of a third embodiment of photographic apparatus incorporating the present invention.

A second alternate embodiment of the present invention is illustrated in FIG. 4 and includes a body release lever 200, a synchronizing lever 210, a high energy lever 230, a shutter 240, a mode selection lever 260, an actuating lever 270 and a film advance slide 280. Body release lever 200 is pivotally mounted on a pin 202, fixed within the camera and is biased in a clockwise direction by a spring 204. Body release lever 200 includes an externally accessible button 206, a flash actuating lug 208, and a daylight actuating lug 209.

Synchronizing lever 210 is movably mounted within the camera by means of a pin 212 which extends through a slot 214. Synchronizing lever 210 is biased to a rest position by a spring 215. Synchronizing lever 210 includes a latch end 216 with an associated cam surface 217, a fixed pin 218, a flash actuating lug 219 and an upwardly extending flash actuating arm 220. Flash actuating arm 220 terminates in a flash actuating surface 222 and a shutter actuating surface 224.

High energy lever 230 is pivotally mounted on a pin 232, fixed within the camera, and is biased in a clockwise direction by a spring 234. Lever 230 includes a shutter actuating lug 236 and a clocking surface 238.

Shutter 240 is the same as shutter 120, as illustrated in FIG. 3, and is mounted on a pin 242, fixed within the camera, for movement by a spring 244 against a stop 246 fixedly mounted in the camera. Shutter 240 includes an aperture covering portion 248 which is aligned with an aperture 250, shown in phantom. Shutter 240 further includes an actuating lug 252.

Mode selection lever 260 is pivotally mounted on a pin 262, fixed within the camera, and is biased in a clockwise direction by a spring 264. Lever 260 includes a flash sensing surface 266 and an engaging surface 268.

Actuating lever 270 is mounted on a pin 272, fixed within the camera, and is biased in a clockwise direction by a spring 274 against a stop 275. Actuating lever 270 includes an actuating surface 276 and an actuating end 278.

Film advance slide 280 is identical with the advance slide illustrated in FIG. 3 and is mounted for sliding motion by means of pins 282 which extend through slots 284. Film advance 280 is biased to the rest position illustrated in FIG. 4 by means of a spring 286. Film advance slide 280 includes a button 288 and a cocking surface 290.

For flash operation, a flash unit is coupled to the camera resulting in downward movement of a pin associated with the flash socket into engagement with sensing surface 266 on mode selection lever 260. As mode selection lever 260 is rotated in a counterclockwise direction against the bias of spring 264, engaging surface 268 disengages from fixed pin 218 to permit upward movement of synchronizing lever 210 by engagement of shutter actuating lug 236 with latch end 216 until flash actuating surface 222 contacts pre-energized striker 14. The camera is now in a condition for exposure operation with a flash unit. As the operator depresses button 206, body release lever 200 is rotated in a counterclockwise direction about pin 202 with engagement of flash actuating lug 208 with flash actuating lug 219 on synchronizing lever 210. Continued movement of lever 200 causes release of pre-energized striker 14 by engagement with flash actuating surface 222. As striker 14 begins to move toward primer 16, it engages shutter actuating surface 224, causing movement of synchronizing lever 210 to the left against the bias of spring 215. Latch end 216 is moved out of engagement with shutter actuating lug 236 permitting high energy lever 230 to move under the bias of spring 234 to actuate the shutter. Shutter actuating lug 236 engages actuating lug 252 on shutter 240 and causes counterclockwise rotation of shutter 240 to an aperture exposing position. When the operator releases button 206, body release lever 200 returns to its clockwise position, disengaging flash actuating lug 208 from flash actuating lug 219 and permitting synchronizing lever 210 to return to its rest position under the bias of spring 215. Meanwhile, shutter 240 is returned to its rest position under the bias of spring 244. When the operator actuates film advance slide 280 by pressing on button 288, cocking surface 290 engages cocking surface 238 and causes counterclockwise rotation of high energy lever 230 against the bias of spring 234 until cam surface 217 engages shutter actuating lug 236 and latches high energy lever 230 behind latch end 216. The camera is now in condition for subsequent exposure taking operation.

For daylight operation with no flash unit coupled to the camera, mode selection lever 260 is rotated to its clockwise position under the bias of spring 264 in which engaging surface 268 engages fixed pin 218 and forces synchronizing lever 210 to rotate around pin 212 to a position in which flash actuating lug 219 is positioned as illustrated in phantom in FIG. 4. Upon subsequent depression of button 206 by the operator, body release lever 200 rotates in a counterclockwise direction with daylight actuating lug 209 engaging actuating surface 276 to cause rotation of actuating lever 270. Actuating end 278 engages flash actuating lug 219 and causes movement of synchronizing lever 210 against the bias of spring 215 until latch end 216 disengages from shutter actuating lug 236. High energy lever 230 is now freed to move in an actuating direction to engage actuating lug 252 and thereby drive shutter 240 to its aperture uncovering position. Upon release of button 206 by the operator, body release lever 200 rotates to its rest position as illustrated in FIG. 4, thereby disengaging daylight actuating lug 209 from actuating surface 276. Actuating lever 270 is now free to move under the bias of spring 274 to its rest position as illustrated in FIG. 4. Synchronizing lever 210 will move under the bias of spring 215 to its rest position. Subsequent actuation of film advance slide 280 by operator contact with button 288 will cause cocking surface 290 to engage cocking surface 238 and thereby rotate high energy lever 230 in a counterclockwise direction against the bias of spring 234 until cam surface 217 permits latch end 216 to latch high energy lever 230 by engagement with shutter actuating lug 236. The camera will now be in condition for subsequent picture taking operation by the operator. In this embodiment of the invention, shutter actuation is achieved in response to movement of a released pre-energized striker 14 when a flash unit is coupled to the camera and by a separate actuating lever 270 when no flash unit is present. Since the presence of a flash unit prevents synchronizing lever 210 from being engaged by the separate actuating lever 270, shutter 240 will not be actuated when there is no striker 14 above flash actuating arm 220 or when striker 14 fails to move to strike primer 16 when released.

This invention has been described in detail with particular reference to preferred embodiments thereof, but it will be understood that variations and modifications can be effected within the spirit and scope of the invention.

We claim:

1. For use with flash units of the type having at least one lamp fireable by striking and at least one pre-energized striker releasable to effect such striking, photographic apparatus comprising:
   a shutter;
   means for receiving such a flash unit; and
   means for releasing a pre-energized striker of a received flash unit and for actuating said shutter in response to receipt of a force from the released pre-energized striker during movement to effect such striking.

2. Photographic apparatus as in claim 1 wherein said releasing and actuating means comprises a synchronizing member and means for moving said synchronizing member into non-releasing contact with a pre-energized striker of a received flash unit and for moving said synchronizing member to release the contacted pre-energized striker, said synchronizing member being mounted for movement, under the urging of the contacted and released pre-energized striker, to cause actuation of said shutter.

3. For use with flash units of the type having at least one lamp fireable by striking and at least one pre-energized striker releasable to effect such striking, photographic apparatus comprising:
   a shutter;
   means for actuating said shutter;
   means for receiving such a flash unit;
   means for releasing a pre-energized striker of a received flash unit and for receiving a force from the released pre-energized striker; and
   means coupling said releasing and receiving means and said shutter actuating means for causing operation of said shutter actuating means in response to receipt of a force by said releasing and receiving means from the released pre-energized striker during movement to effect such striking.

4. Photographic apparatus as in claim 3, wherein said releasing and receiving means includes a synchronizing member engageable with said coupling means and means for moving said synchronizing member into non-releasing contact with a pre-energized striker of a received flash unit and for moving said synchronizing member to release the contacted pre-energized striker, said synchronizing member being mounted for movement, under the urging of the contacted and released pre-energized striker, to engage said coupling means and cause operation of said shutter actuating means.

5. For use with flash units of the type having at least one lamp fireable by striking and at least one pre-energized striker releasable to effect such striking, photographic apparatus comprising:
   a shutter;
   means for operating said shutter;
   means for receiving such a flash unit;
   means for releasing a pre-energized striker of a received flash unit, said releasing means including a synchronizing member and means for moving said synchronizing member into non-releasing contact with a pre-energized striker of a received unit and for moving said synchronizing member to release the contacted pre-energized striker, said synchronizing member being mounted for movement to a shutter operating position under the urging of the released pre-energized striker; and
   means coupling said synchronizing member and said shutter operating means for effecting operation of said shutter in response to movement of said synchronizing member to said shutter operating position.

6. For use with flash units of the type having at least one flashlamp fireable by striking and at least one pre-energized striker releasable for effecting such striking, photographic apparatus comprising:
   a shutter;
   means for actuating said shutter;
   means for receving such a flash unit;
   a synchronizing member positionable in contact with a pre-energized striker of a received flash unit;
   means for applying a force to said synchronizing member to release the contacted pre-energized striker; and
   means coupling the pre-energized striker, said synchronizing member and said shutter actuating means for transmitting energy from a released pre-energized striker through said synchronizing member to said shutter actuating means to effect actuation of said shutter in response to movement of the contacted and released pre-energized striker to effect such striking.

* * * * *